(12) United States Patent
Herbert, Jr.

(10) Patent No.: US 6,741,749 B2
(45) Date of Patent: May 25, 2004

(54) SYSTEM, DEVICE, COMPUTER PROGRAM PRODUCT, AND METHOD FOR REPRESENTING A PLURALITY OF ELECTRONIC INK DATA POINTS

(75) Inventor: Peter F. Herbert, Jr., Durham, NC (US)

(73) Assignee: Advanced Digital Systems, Inc., Durham, NC (US)

( * ) Notice: Subject to any disclaimer, the term of this patent is extended or adjusted under 35 U.S.C. 154(b) by 579 days.

(21) Appl. No.: 09/768,949

(22) Filed: Jan. 24, 2001

(65) Prior Publication Data

US 2002/0136462 A1 Sep. 26, 2002

(51) Int. Cl.$^7$ .............................. G06K 9/36; G06K 9/22
(52) U.S. Cl. ........................................ 382/246; 382/314
(58) Field of Search ................................ 382/186, 187, 382/188, 189, 232, 233, 241, 244, 246, 311, 312, 313, 314, 315, 317; 707/1, 6

(56) References Cited

U.S. PATENT DOCUMENTS

| | | | |
|---|---|---|---|
| 4,793,810 | A | 12/1988 | Beasley, Jr. |
| D308,364 | S | 6/1990 | Beasley, Jr. et al. |
| 5,113,041 | A | 5/1992 | Blonder et al. |
| RE34,476 | E | 12/1993 | Norwood |
| 5,287,417 | A | 2/1994 | Eller et al. |
| 5,347,477 | A | 9/1994 | Lee |
| 5,392,390 | A | 2/1995 | Crozier |
| 5,465,325 | A | 11/1995 | Capps et al. |
| 5,544,295 | A | 8/1996 | Capps |
| 5,577,135 | A | 11/1996 | Grajski et al. |
| 5,583,543 | A | 12/1996 | Takahashi et al. |
| 5,596,694 | A | 1/1997 | Capps |
| 5,613,019 | A | * 3/1997 | Altman et al. .............. 382/311 |

(List continued on next page.)

OTHER PUBLICATIONS

Anoto, AB, *Anoto Pen*, available at (visited Dec. 21, 2000) <http://www.anoto.com/pressroom/bin/anoto_pen.pdf>, 1 total page.

Anoto, AB, *Applications Illustrations*, available at (visited Dec. 21, 2000) <http://www.anoto.com/pressroom/bin/Applications_illus.pdf>, 1 total page.

Website: Seiko Instruments USA Inc., *Seiko Instruments—Business and Home Office Products Division* (visited Dec. 21, 2000) <http://www.seikosmart.com>, 7 total pages.

Website: Electric Pocket Limited, *BugMe.net: Yellow Stickies for Your Palm OS Handheld?*(visited Dec. 21, 2000) <http://www.bugme.net>, 15 total selected pages.

Electric Pocket Limited, *BugMe? User Guide*, available at (last modified Feb. 13, 2001) <http://www.bugme.net/BugMe.pdf>, 7 total pages.

(List continued on next page.)

*Primary Examiner*—Andrew W. Johns
*Assistant Examiner*—Amir Alavi
(74) *Attorney, Agent, or Firm*—Alston & Bird LLP

(57) ABSTRACT

The present invention provides a system, device, computer program product, and method for representing a plurality of electronic ink data points. According to one embodiment, the system includes a first computing device having a writing stylus, a handwriting capture interface, a processing element and a transmitter. The handwriting capture interface captures a plurality of electronic ink data points based upon a position of the writing stylus, while the processing element is capable of determining a derivative of at least the second order of the electronic ink data points. The transmitter transmits data representative of the high-order derivative of the electronic ink data points. The system also includes a second computing device capable of receiving the data. The second computing device includes a processing element for reconstructing the electronic ink data points based upon the high-order derivative and independent of all but one of the electronic ink data points originally captured.

42 Claims, 5 Drawing Sheets

U.S. PATENT DOCUMENTS

| | | | |
|---|---|---|---|
| 5,625,833 A | | 4/1997 | Levine et al. |
| 5,629,499 A | | 5/1997 | Flickinger et al. |
| 5,666,438 A | * | 9/1997 | Beernink et al. ............ 382/189 |
| 5,666,530 A | | 9/1997 | Clark et al. |
| 5,680,480 A | * | 10/1997 | Beernink et al. ............ 382/187 |
| 5,680,636 A | | 10/1997 | Levine et al. |
| 5,682,439 A | | 10/1997 | Beernink et al. |
| 5,737,740 A | | 4/1998 | Henderson et al. |
| 5,787,312 A | | 7/1998 | Suzuki |
| 5,797,089 A | | 8/1998 | Nguyen |
| 5,818,425 A | | 10/1998 | Want et al. |
| 5,838,819 A | | 11/1998 | Ruedisueli et al. |
| 5,920,647 A | * | 7/1999 | Nowlan et al. ............. 382/187 |
| 5,930,380 A | | 7/1999 | Kashi et al. |
| 6,018,591 A | | 1/2000 | Hull et al. |
| 6,101,280 A | * | 8/2000 | Reynolds ................... 382/241 |
| 6,153,836 A | | 11/2000 | Goszyk |
| 6,363,381 B1 | * | 3/2002 | Lee et al. ...................... 707/6 |
| 6,393,395 B1 | * | 5/2002 | Guha et al. ................. 704/232 |
| 6,459,418 B1 | * | 10/2002 | Comiskey et al. .......... 345/107 |
| 6,549,675 B2 | * | 4/2003 | Chatterjee ................... 382/244 |
| 6,565,611 B1 | * | 5/2003 | Wilcox et al. ............. 715/541 |

OTHER PUBLICATIONS

Electric Pocket Limited, *BugMe? Messenger User Guide, available at* (last modified Feb. 13, 2001) <http://www.bugme.net/BugMeMessenger.pdf>, 8 total pages.

Electric Pocket Limited, *BugMe? For Palm OS* (acquired Dec. 21, 2000), 4 total pages.

Website: Ecrio, Inc.; *Welcome to ecrio.com, Ecrio, Inc.* (visited Dec. 21, 2000) <http://www.ecrio.com>, 10 total selected pages.

Website: Ecrio, Inc., *Ecrio White Paper* (visited Dec. 21, 2000) <http://www.ecrio.com/products/p_htm>, 10 total pages.

Website: Ecritek Corp., *About Ecritek Corporation* (visited Jun. 26, 2000) <http://www.ecritek.com/company/company.html>, 54 total pages.

Website: Anoto AB, *Anoto—join the revolution* (visited Dec. 21, 2000) <http://www.anoto.com>, 29 total selected pages.

Website: Anoto, AB, *Anoton—Home* (visited Jul. 26, 2000) <http://www.anoto.com/main.asp>, 16 total pages.

Anoto, AB, *A comparison of Anoto Technology with Other Relevant Systems, available at* (visited Dec. 21, 2000) <http://www.anoto.com/pressroom/bin/comparison.pdf>, 17 total pages.

Anoto, AB, *Technical Brochure, available at* (visited Dec. 21, 2000) <http://www.anoto.com/pressroom/bin/technical_brochure.pdf>, 16 total pages.

* cited by examiner

SYSTEM, DEVICE, COMPUTER PROGRAM PRODUCT, AND METHOD FOR REPRESENTING A PLURALITY OF ELECTRONIC INK DATA POINTS

FIELD OF THE INVENTION

The present invention relates to data processing of handwritten information captured by pen-enabled computing systems and, more particularly, to a system, device, computer program product, and method for representing a plurality of electronic ink data points.

BACKGROUND OF THE INVENTION

Pen-enabled computing is a relatively recent development wherein a user interfaces with a computing system by way of a writing stylus instead of a mouse or a keyboard. In some instances, a pen-enabled computing system provides an electronic writing tablet having an overlaid writing surface. Such a writing surface may comprise, for example, a blank sheet of paper or a preprinted form. The writing stylus, in turn, may comprise a device capable of inputting data (a "handwriting input") into the pen-enabled computing system while providing both a visible, or "written ink," copy of the data on the writing surface and an "electronic" copy of the data within the pen-enabled computing system. Such a writing stylus may comprise, for example, a conventional pen, a conventional pencil, a radio transmitter, a magnetic or electric field device, an optical device, an ultrasound transceiver, or combinations thereof.

Once the electronic copy of the data is entered into the pen-enabled computing system, the data may be stored as an "electronic ink" copy, wherein the handwriting input is captured as written, or as a "text" copy, wherein the handwriting input is captured, recognized, and translated into the corresponding text. In some instances, the pen-enabled computing system may be capable of producing both an electronic ink and a text copy of the handwriting input. Since the writing stylus is generally capable of providing a written ink copy of the handwriting input on the writing surface, the user is automatically provided with a hard copy, or visual feedback, of the entered data. It is understood, however, that a written ink copy of the handwriting input may not be provided in some instances, wherein the handwriting input is only captured and stored in the pen-enabled computing system as an electronic copy. Examples of pen enabled computing devices include the CrossPad™ portable digital notepad by the A. T. Cross Company and the Palm Connected Organizer™ personal data assistant (PDA) by Palm, Inc.

Typically, the pen-enabled computing system senses the position and/or movement of the writing stylus with respect to the electronic writing tablet, which is stored in the pen-enabled computing system as a series of electronic ink data points constituting the handwriting input. In these systems, the electronic ink data points consist of, or are converted to, sets of Cartesian coordinates representing points along the path of the writing stylus as it moves with respect to the electronic writing tablet. The handwriting input is often then desirably used for other purposes. However, for the handwriting input to be subsequently utilized, it is often translated from the user's handwriting to text form. While text translation schemes may facilitate practical uses for the handwritten data, they are often not able to accurately translate the user's handwriting. In addition, translation routines may require additional processing and storage capacity which could be used for other purposes and may add size and cost to the pen-enabled computing system.

Some conventional pen-enabled computing systems utilize handwriting input without necessarily requiring the handwriting input to first be translated into text form. Typically, in these systems, the pen-enabled computing system stores the sets of Cartesian coordinates to allow the system or a separate computer or processor to reconstruct the handwriting input, either immediately or at a later time. Conventional representations of sets of coordinates may require several (e.g., three or four) bytes per coordinate pair. As such, a single paper page of handwriting can consist of thousands of coordinate pairs. In this regard, conventional systems may require several thousand bytes to represent a single paper page. Thus, conventional systems may require significant storage capacity and communications bandwidth to store and transmit electronic ink data.

To decrease the storage capacity required to store a set of electronic ink data points, some systems encode the data points. In some systems, the electronic ink data points are encoded by storing and/or transmitting the initial point of the writing stylus and, thereafter, storing and/or transmitting the first derivative of each subsequent point along the path of the writing stylus as the writing stylus moves with respect to the electronic handwriting tablet. In other systems, the electronic ink data points are encoded using an encoding algorithm, such as Huffman coding. The encoded electronic ink data points are then stored and/or transmitted to a separate computer or processor in a more efficient manner. In order to recreate the handwriting input, the encoded data points are subsequently decoded. While these systems reduce the storage capacity required to store and/or the bandwidth required to transmit a set of electronic ink data points, it would still be desirable to further reduce the storage capacity and/or bandwidth required to transmit the data points. Thus, there exists a need for a pen-enabled computing system capable of representing a series of electronic ink data points in a manner that further reduces the storage capacity required to store and/or the bandwidth required to transmit the data points.

SUMMARY OF THE INVENTION

In light of the foregoing background, the present invention provides a pen-enabled computing system, device, computer program product and associated method for representing a plurality of electronic ink data points in a manner that requires less storage capacity to store and/or less bandwidth to transmit the data points than conventional systems and methods. Generally, the pen-enabled computing device includes a writing stylus, a handwriting capture interface and a processing element. The handwriting capture interface is capable of capturing electronic ink data points based upon the position of the writing stylus. For example, the handwriting capture interface may include an electronic handwriting tablet that is capable of sensing the position of the writing stylus. Additionally, the processing element is capable of determining a high-order derivative of the electronic ink data points and thereafter encoding the high-order derivative of the plurality of electronic ink data points, such as by Huffman encoding. In this context, the high-order derivative is a derivative of an order of two or greater. By first representing the electronic ink data points with a high-order derivative and thereafter encoding the high-order derivative, a compressed representation is obtained. By compressing the representation of the data points, the amount of storage capacity required to store and/or the bandwidth required to transmit the representation of the data points decreases.

In one embodiment, the pen-enabled computing device further includes a user interface that interacts with the processing element to provide handwritten information to a user. In a further embodiment, the pen-enabled computing device includes a storage device for storing the encoded high-order derivative of the electronic ink data points. In yet another embodiment, the pen-enabled computing device further includes a transmitter for transmitting the encoded high-order derivative of the plurality of electronic ink data points to another computing device, such as a server or the like.

In operation, the handwriting capture interface captures the electronic ink data points based upon the position of the writing stylus. In embodiments including an electronic handwriting tablet, the handwriting capture interface captures the electronic ink data points based upon the position of the writing stylus with respect to the electronic handwriting tablet. The processing element then determines the high-order derivative of the electronic ink data points. In some embodiments, the high-order derivative values are tokenized, whereby tokens are assigned to represent the high-order derivative. Tokenizing the high-order derivatives reduces the number of possibilities represented by the encoded data and, therefore, the number of distinct encoded values. Using Huffman encoding, for example, each Huffman code corresponds to a leaf node in a canonical Huffman tree. By tokenizing, the number of leaf nodes is reduced.

Next, the processing element encodes the high-order derivative (either directly or following tokenization) to obtain a compressed representation of the electronic ink data points. According to one aspect of the present invention, the foregoing operations are preferably performed by a computer program product executing within the pen-enabled computing device. In embodiments including a storage device, the compressed representation of the electronic ink data points is stored after being encoded. In embodiments including a transmitter, the compressed representation of the electronic ink data points is transmitted after being encoded. In either embodiment, the original electronic ink data points can then be reconstructed based upon the high-order derivative and independent of all but one of the electronic ink data points that were previously captured.

To allow a user to view handwritten information captured by the pen-enabled computing device, the present invention also provides a system for transmitting handwritten information that includes a first computing device, such as a pen-enabled computing device, having a writing stylus, a handwriting capture interface, a processing element responsive to the stylus, and a transmitter. The handwriting capture interface of the first computing device captures the electronic ink data points based upon a position of the writing stylus and the processing element determines the high-order derivative of the electronic ink data points. In one embodiment, the processing element of the first computing device also tokenizes and then encodes the high-order derivative of the electronic ink data points. The transmitter, in turn, transmits data representative of the high-order derivative of the electronic ink data points. In one embodiment, the first computing device further includes a storage device for storing the high-order derivative of the electronic ink data points.

The system of this embodiment further includes a second computing device for receiving the data transmitted by the first computing device. The second computing device includes a processing element for reconstructing the electronic ink data points based upon the high-order derivative without using the original electronic ink data points that were captured by the first computing device. In one embodiment, the second computing device further includes a user interface that interacts with the processing element of the second computing device to provide the handwritten information to a user. In embodiments in which the high-order derivative has been encoded prior to transmission by the first computing device, the processing element of the second computing device is adapted to reconstruct the plurality of electronic ink data points by decoding the high-order derivative of the plurality of electronic ink data points. In a further embodiment, the processing element of the second computing device is capable of formatting the reconstructed plurality of electronic ink data points into handwritten information capable of being communicated by email, facsimile and/or instant messaging.

The present invention, therefore, provides a pen-enabled computing system, device, computer program product and associated method for representing a series of electronic ink data points, while further reducing the storage capacity required to store and/or the bandwidth required to transmit the data points. By compressing the electronic ink data points with a high-order derivative, the number of unique numerical values that are required to represent the data points is reduced and, by encoding the high-order derivative, the number of bits required to represent each unique numerical value is also decreased. Accordingly, the storage capacity required to store and/or the bandwidth required to transmit the handwritten data is reduced, while still permitting the original handwriting input to be reconstructed in a lossless manner.

BRIEF DESCRIPTION OF THE DRAWINGS

Figure 1:
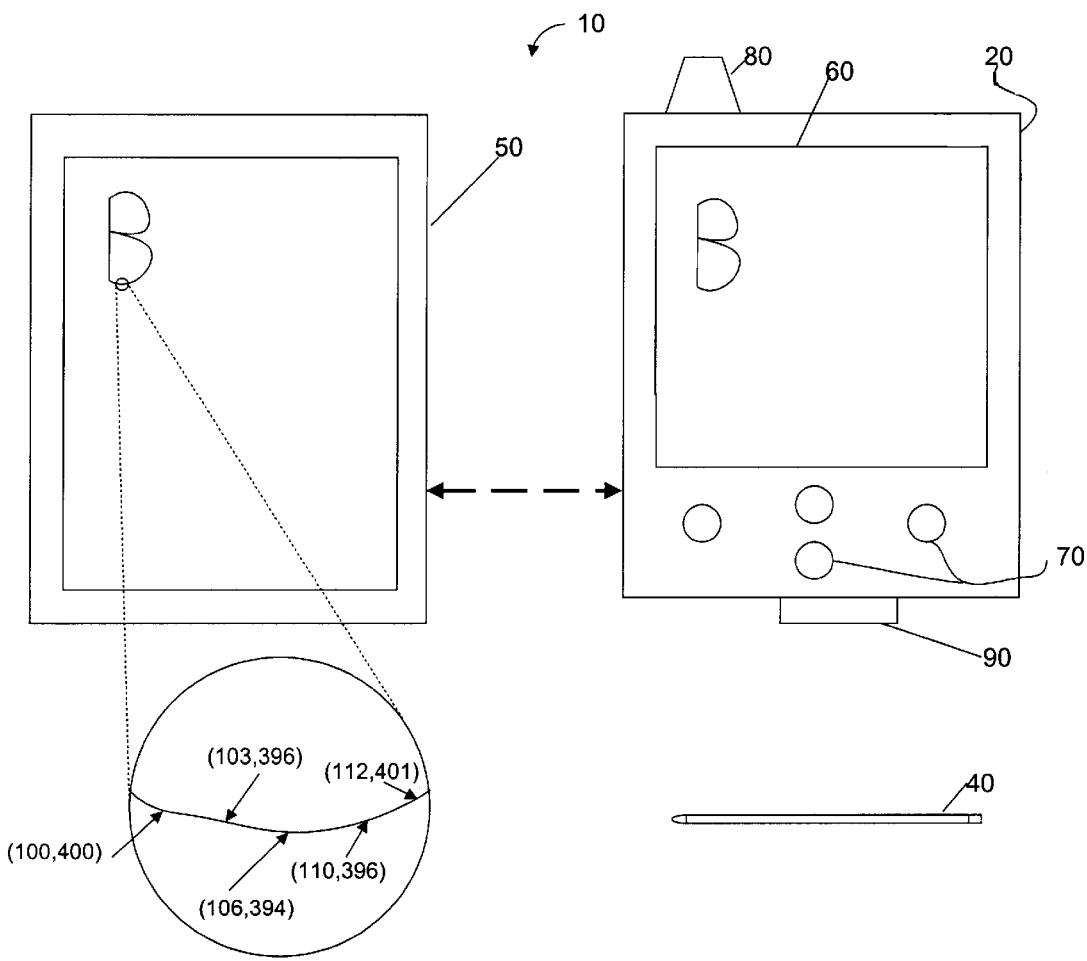
Figure 2:
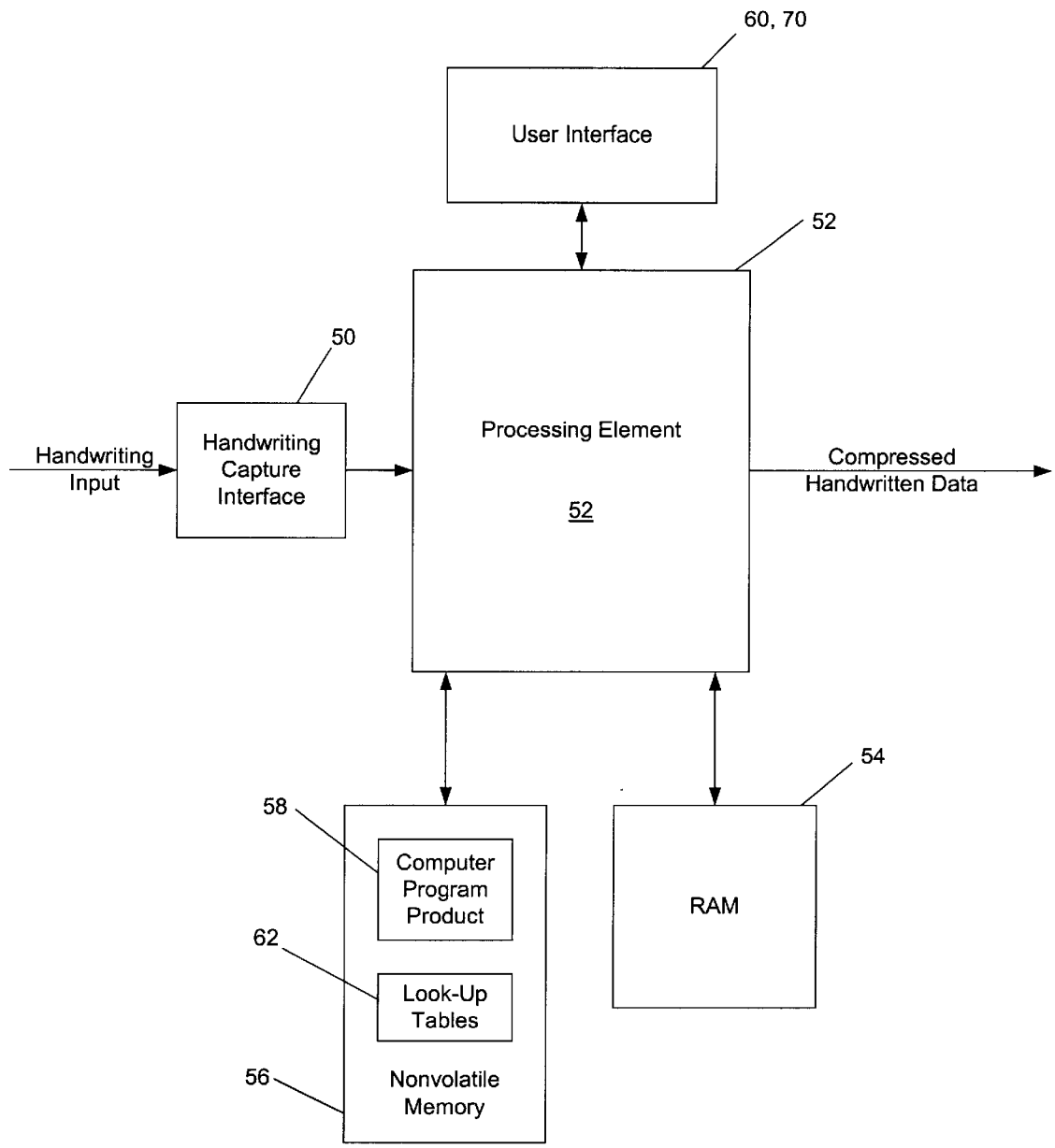
Figure 3:
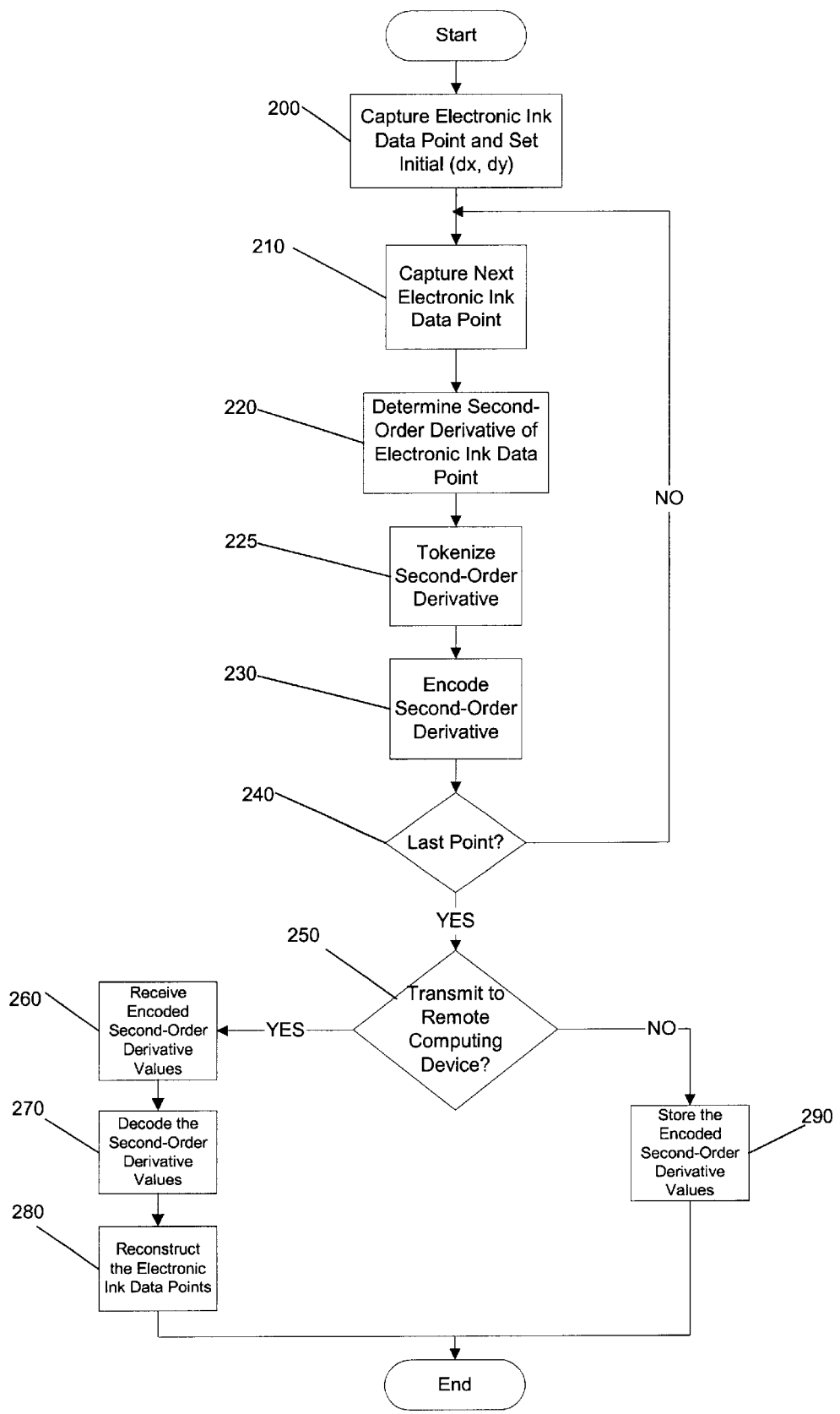
Figure 4:
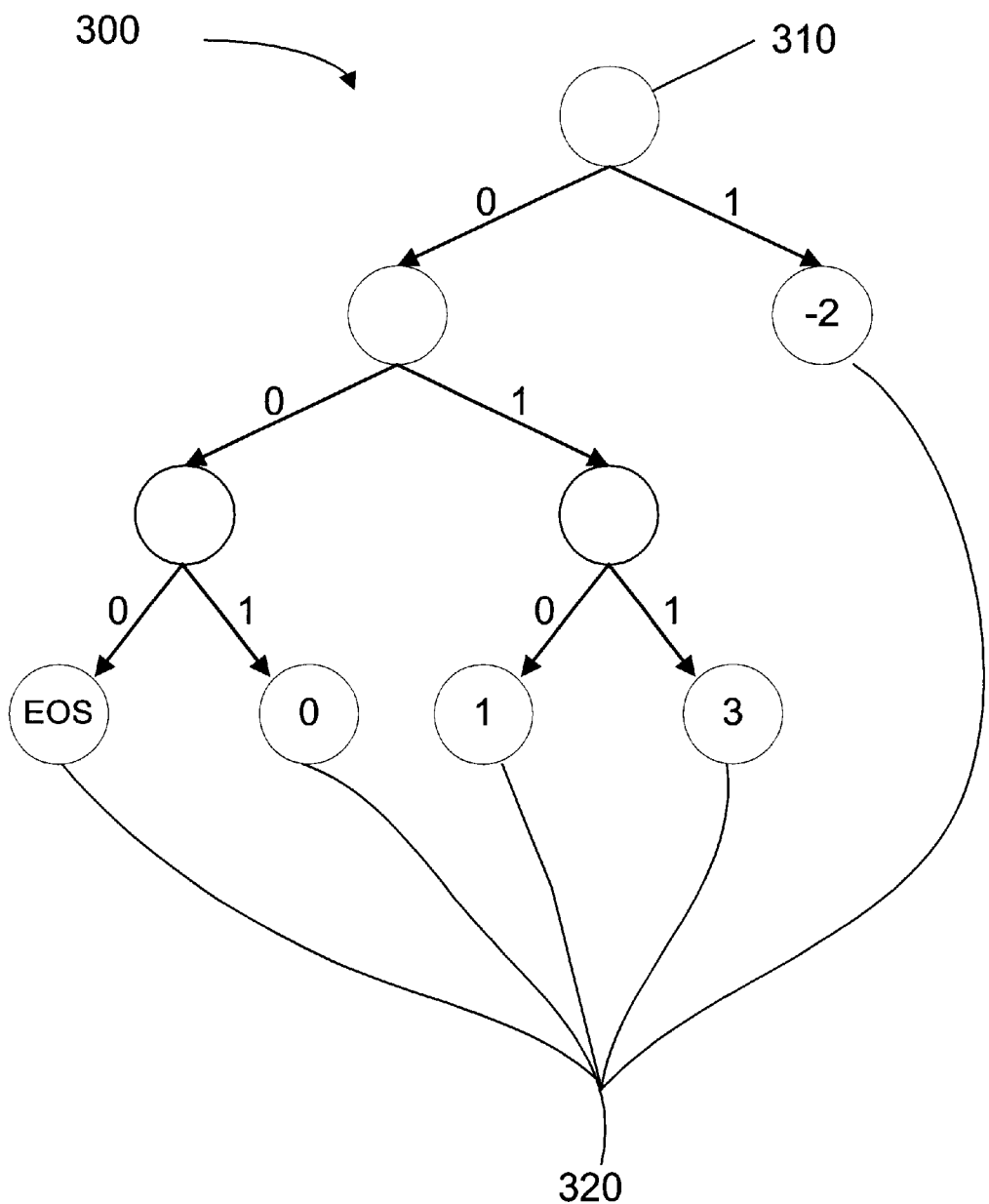
Figure 5:
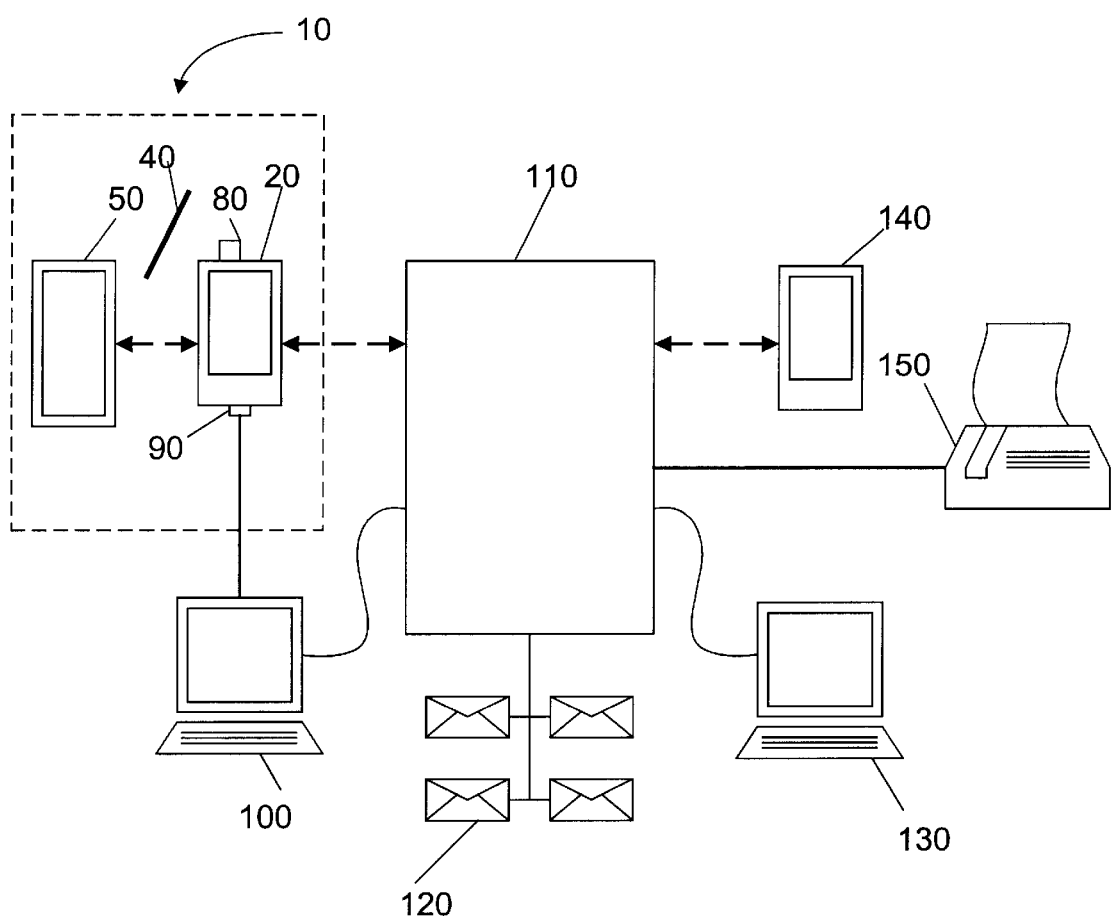

Having thus described the invention in general terms, reference will now be made to the accompanying drawings, which are not necessarily drawn to scale, and wherein:

FIG. 1 is a schematic diagram illustrating the pen-enabled computing device according to one embodiment of the present invention with an exploded view illustrating a series of electronic ink data points;

FIG. 2 is a block diagram illustrating some of the components of the pen-enabled computing device according to one advantageous embodiment of the present invention;

FIG. 3 is a flow diagram illustrating the operations performed to represent a plurality of electronic ink data points according to one embodiment of the present invention;

FIG. 4 illustrates an encoding tree structure for Huffman encoding high-order derivative components; and FIG. 5 depicts a system for transmitting handwritten information according to one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As described above, pen-enabled computing systems capture handwriting input that is often desirably used for other purposes. For example, the handwritten information itself may be bodily incorporated into messages, such as email messages, facsimiles, instant messages and the like. Alternatively, the handwritten information can be converted into text by means of character recognition or the like, with the resulting text incorporated into messages or stored for future use. The pen-enabled computing system oftentimes communicates with another computer or processor to view, modify or otherwise process the data, as well as to further distribute the data. Typically, conventional pen-enabled computing systems that utilize handwriting input, or electronic ink data, without first translating it into text form, store and/or transmit the electronic ink data points as sets of Cartesian coordinates. Unfortunately, the memory required to store the handwriting input or the bandwidth required to transmit the handwriting input can sometimes be substantial, especially in instances in which the resolution of the handwriting input is enhanced or the handwriting input is smoothed.

As described in greater detail below, the present invention provides a pen-enabled computing system, device, computer program product and associated method for representing a series of electronic ink data points in a manner that reduces the storage capacity required to store and/or the bandwidth required to transmit the data points. Advantageously, by compressing the electronic ink data points with a high-order derivative, the number of different values required to represent the electronic ink data points decreases relative to conventional systems. Additionally, by encoding the high-order derivatives, each different value can be represented by a small number of bits, thereby obtaining a compressed representation of the original handwriting input. The decrease in the number of values and the representation of each different value by a small number of bits decreases the storage capacity required to store and/or the bandwidth required to transmit a representation of the handwriting input.

The pen-enabled computing device 10 of the present invention can be embodied in a number of different manners. In one advantageous embodiment, however, the pen-enabled computing device is a portable or handheld device, such as a personal digital assistant (PDA), a personal communication system (PCS), a smart phone, a portable computer or other type of portable or handheld computing device. However, the pen-enabled computing device can be a personal computer or any other type of stationary computing device so long as the first computing device is capable of capturing handwritten information and thereafter processing the handwritten information as described hereinbelow.

Although the pen-enabled computing device 10 can be embodied in many different manners, the pen-enabled computing device typically has a handwriting capture interface 50 that is responsive to a writing stylus 40. The pen-enabled computing device can include a variety of handwriting capture interfaces. For example, the handwriting capture interface can include a touch sensitive screen capable of identifying those points on the screen with which the writing stylus comes into contact and for providing signals representative of the coordinates of the respective points on the screen. Alternatively, the first computing device can include an electronic handwriting tablet as shown in FIG. 1 that cooperates with the writing stylus to determine the position of the writing stylus relative to the electronic handwriting tablet at a plurality of successive instances in time. In this regard, the writing stylus may include a radio transmitter, an ultrasound transceiver or the like for communicating with the electronic handwriting tablet. As such, the electronic handwriting tablet of these embodiments would include a corresponding receiver for detecting the signals indicative of the position of the writing stylus. Alternatively, the writing stylus can be designed to identify its relative position by optical, electric or magnetic means or by any other means known to those skilled in the art. In addition to capturing a plurality of "electronic ink" data points defining the position of the writing stylus over time, a written record of the handwritten information may also be created. For example, a piece of paper can be mounted upon the electronic handwriting tablet such that the writing stylus concurrently marks upon the piece of paper while communicating with the electronic handwriting tablet to create the plurality of "electronic ink" data points. In yet another alternative embodiment, the writing stylus may be designed such that the writing stylus itself detects its relative position with respect to a piece of paper and then electronically communicates with the handwriting capture interface without employing a conventional electronic handwriting tablet. In these instances, the writing stylus may detect a faint dot pattern printed on the paper or sense the fibers of the paper in order to detect or determine its relative position with respect to the piece of paper. One system that includes a writing stylus that detects its position relative to a sheet of paper is provided by Anoto.

Regardless of the manner in which the handwriting capture interface 50 is embodied, the handwriting capture interface captures and provides a series of data points, typically represented by X, Y coordinate points, representative of the position of the writing stylus 40 at a plurality of successive instances in time. The set of coordinate points from the time at which the writing stylus initiates contact with the touch sensitive screen, electronic handwriting tablet or paper to the time at which the writing stylus is lifted from the touch sensitive screen, electronic handwriting tablet or paper defines a writing stroke, a plurality of which typically define the handwritten information that has been entered by the user.

In addition to the handwriting capture interface 50 and the writing stylus 40, the pen-enabled computing device 10 also includes a processing element 52, such as a central processing unit, and associated memory, such as random access memory (RAM) 54 and a non-volatile storage device 56. The non-volatile storage device, such as, for example, flash memory, an EEPROM or a disk, is typically used for storing and/or executing a computer program product 58 as well as storing useful data such as, for example, electronic ink data and/or compressed representations of the electronic ink data, as described below. Further, the RAM is generally used for loading and executing the computer program product. As described below, the computer program product generally cooperates with the processing element to control the operation of the pen-enabled computing device 10. For example, the computer program product can drive the handwriting capture interface to interface and cooperate with a writing stylus and can subsequently control the processing of the electronic ink data points that have been captured. It should be understood, however, that even though the computer program product can control the operation of the pen-enabled computing device, this control can, instead, be accomplished through various hardware or firmware configurations without departing from the spirit and scope of the present invention.

In the illustrated embodiment, the handwriting capture interface 50 is a discrete component from the remainder of the pen-enabled computing device 10, and is adapted to communicate with the remainder of the pen-enabled computing device, i.e., the processing element 52 via any conventional communications technique, including a wired connection, such as an RS232 connection, or a wireless connection, such as by means of a Bluetooth interface. In this regard, the embodiment of the pen-enabled computing device depicted in FIG. 1 includes an antenna 80 for facilitating wireless communication and an external device interface 90 for facilitating wired connections with the handwriting capture interface or other components. However, the first computing device can be formed as a single component with the handwriting capture interface, the processing element, the associated memory and any other elements assembled in a single package.

The pen-enabled computing device 10 can also include a user interface. The user interface includes provisions for facilitating interaction between the device and a user. The user interface may include a display 60 and one or more control buttons 70. The user interface may comprise, for example, one or more buttons for initiating functions within the device or for providing other types of input where, in some instances, the buttons may comprise a part of a keyboard or a keypad. The user interface may also comprise an apparatus for allowing the user to view displayed data or status information such as, for example, a viewing screen or monitor. Also, the user interface may comprise a touch screen that allows the user to input handwriting data directly into the device as part of the handwriting capture interface of the processing element. In some instances, the user interface may also include an audio mechanism such as, for example, a buzzer, bell, or other indicator or other devices capable of supporting voice interaction between the device and the user. Still further, for example, a vibration mechanism may also be used as an alert or acknowledgement indicator. Accordingly, the user interface may be implemented in many different manners, combinations thereof, and/or in conjunction with different components of the device.

According to one embodiment of the present invention, the handwriting input is captured and stored by the handwriting capture interface 50 as a coordinate representation of the movement of the writing stylus 40 relative to the handwriting tablet. In particular, the handwriting capture interface typically provides the processing element 52 with a plurality of electronic ink (X, Y) data points representative of the position of the writing stylus relative to the handwriting tablet at different points in time. In this context, a stroke is generally defined as a continuous marking by the writing stylus beginning with the commencement of contact or other interaction between the writing stylus and the handwriting tablet and terminating with the removal of the writing stylus from the handwriting tablet. For example, a "c" is generally formed of one stroke, while a "t" is generally formed of two strokes. As illustrated in FIG. 1, for example, a handwritten "B" can be formed of one stroke consisting of many electronic ink data points, the X, Y coordinates of five of which are shown in an exploded view.

As the writing stylus 40 commences interaction with the handwriting tablet, the handwriting capture interface 50 captures an initial point as a pair of Cartesian coordinates, illustrated as point (100,400) in FIG. 1 and Table 1, and block 200 in FIG. 3. If the handwriting input consists of multiple strokes, however, only the initial point of the first stroke of the handwriting input is captured as a pair of Cartesian coordinates. In this regard, the beginning points of subsequent strokes in the handwriting input are captured as offset values from the terminating point of the previous stroke. Also, with regard to the initial point of the first stroke and subsequent beginning points, because the writing stylus begins from a standstill for each stroke, the processing element sets an initial movement vector (dx, dy) for the initial point and any subsequent beginning points equal to a set value, such as (0, 0) so as to allow for the calculation of the high-order derivative of subsequent points in each stroke. For purposes of description only, the following description only references an initial point. It should be understood, however, that the referenced initial point can be either the initial point of the first stroke or the beginning point of subsequent strokes in the handwriting input.

As the writing stylus moves from the initial point to the next point along the path of the stroke, the handwriting capture interface captures the next point and the processing element 52 may calculate a movement vector (dx, dy) that represents the change in the x-direction and the change in the y-direction between the two points. As the following equation illustrates, the coordinate location of the current point can be readily determined from the coordinate location of the previous point and the movement vector between the previous point and the current point Current Point=Previous Point+$(dx,dy)$ Accordingly, as each successive point along the path of the stroke is captured by the handwriting capture interface 50, the processing element 52 determines the movement vector for the point. In addition to determining the movement vector between each pair of coordinate points, the processing element determines a high-order derivative for each successive point. As described hereinafter, for example, the processing element typically determines the second-order derivative, i.e., the relative change in the movement vector from the previous point to the current point, for each successive point, although the processing element could instead determine derivatives having any order greater than two, if so desired. See, for example, blocks 210 and 220 of FIG. 3. As such, the coordinate location of a point (designated 2) could determined based upon the coordinate location of the previous point (designated 1), the movement vector $(dx,dy)_{10}$ between the previous point and the immediately preceding point (designated 0) and the second derivative $(d_2x,d_2y)_{21}$ between the previous point and the current point according to the following equation:

Current Point=Previous Point+$(dx,dy)_{10}$+$(d_2x,d_2y)_{21}$

By way of example, the coordinate locations of five successive points from the exploded portion of the "B" depicted in FIG. 1, and the movement vector and the second order derivative for the points are depicted below in Table 1.

TABLE 1

| Raw Point (x, y) | Delta (dx, dy) | Double Delta (d2x, d2y) |
|---|---|---|
| 100,400 | 0, 20 | |
| 103,396 | 3, −4 | 3, −4 |
| 106,394 | 3, −2 | 0, 2 |
| 110,396 | 4, 2 | 1, 4 |
| 112,399 | 2, 3 | −2, 1 |

For derivatives higher than second-order, the processing element 52 would determine the higher-order derivatives in the same manner. Once the processing element calculates the desired high-order derivative for an electronic ink data point, the process then continues for each successive electronic ink data point captured by the handwriting capture interface 50 along the path of the stroke, as illustrated in block 240 of FIG. 3. Although the process of determining the high-order derivative is described herein as being performed concurrently with the capture of the coordinate locations of the data points themselves, the processing element may determine the high-order derivatives only after the handwriting capture interface has captured the coordinate locations of each of the data points and has provided the coordinate locations to the processing element.

As will be apparent from Table 1, by representing the plurality of data points by high-order derivatives, such as second-order derivatives, the number of unique or different numerical values required to represent the plurality of data points is substantially reduced relative to representations of the data points by their coordinate points or by the first derivatives that correspond to the data points. Thus, because the standard deviation decreases, the frequency distribution of the high-order derivative information is sharpened substantially relative to the frequency distribution of the other representations. In this regard, encoding methods such as Huffman encoding, provide efficient encoding of data because such encoding methods assign the shortest codes to the most frequently occurring values, and a sharper distribution means the most frequently occurring values occur more frequently. As such, the resulting representation of the data points, i.e., the coordinates of the initial point and the second derivative of each successive point, can be substantially compressed once the resulting representation of the data points has been encoded, as described below.

Once each of the high-order derivatives of the electronic ink data points has been determined, the processing element can encode each high-order derivative, as illustrated in block 230 of FIG. 3. As described above in conjunction with the determination of the high-order derivative, the encoding can be performed concurrently with the capture of the data points and the determination of the high-order derivative as shown in FIG. 3, or the encoding can be performed once all of the data points have been captured and the high-order derivatives have each been determined. It should be understood, however, that the initial point of the first stroke and any subsequent beginning points need not, and preferably are not, encoded.

Alternatively, the high-order derivatives can be tokenized prior to being encoded as shown by block 225 of FIG. 3, with the resulting tokens thereafter being encoded. As stated before and explained hereinafter, by tokenizing the high-order derivatives the number of possibilities represented by the encoded data is reduced which, in turn, reduces the number of distinct encoding values. Using Huffman encoding, for example, each Huffman code corresponds to a leaf node in a canonical Huffman tree. By tokenizing, the number of leaf nodes is reduced. In particular, each numerical value of the high-order derivatives can be represented by a combination of one or more tokens. In one embodiment described more fully below, sixty-four tokens are utilized to represent each numerical value of the high-order derivatives with the first thirty-two tokens, i.e., tokens 00 (hexadecimal) to 1f (hexadecimal), being terminal tokens, the second thirty-one tokens, i.e., tokens 20 (hexadecimal) to 3e (hexadecimal), being add-on tokens, and the last token, i.e., token 3f, being reserved to represent the end of a stroke. In a typical handwriting application, the most common values for the high-order derivatives are the smallest numerical values, with larger numerical values occurring much less frequently. As such, in one embodiment, high-order derivatives having a value ranging from −16 to 15 are represented by a single terminal token ranging from 0 to 31. The values ranging from −16 to 15 can be assigned or mapped to terminal tokens 0–31 in various manners. In one embodiment, however, each of the values ranging from −16 to 15 is multiplied by two. For the positive values, the terminal token is equal to the resulting product, termed PosD2. For negative values, however, the absolute value of the product is decremented by one to obtain PosD2, with the terminal token being equal to PosD2.

For high-order derivatives having larger magnitudes, the high-order derivatives are represented by a combination of a terminal token and one or more add-on tokens in order to reduce the number of distinct values that need to be represented by the encoded data points. While various tokenizing techniques can be utilized without departing from the spirit and scope of the present invention, the system and method of one embodiment tokenizes the high-order derivatives having larger values by again determining the value of PosD2 that corresponds to each of these larger values of the high-order derivatives. To obtain PosD2 according to this embodiment, the value of the high-order derivative is again multiplied by two. For high-order derivatives having positive values, PosD2 is set equal to the resulting product. For high-order derivatives having negative values, however, the absolute value of the resulting product is decremented by one to obtain PosD2. According to this embodiment, the high-order derivatives corresponding to PosD2 having a value between 32 and 991, inclusive, will be represented by one add-on token and one terminal token, while high-order derivatives corresponding to PosD2 having a value of at least 992 will be represented by two or more add-on tokens and one terminal token.

For high-order derivatives corresponding to PosD2 having a value between 32 and 991, inclusive, the add-on token will be determined according to this exemplary embodiment as follows: (1) the binary representation of PosD2 will be shifted to the right five times, i.e., the binary representation of PosD2 is divided by $2^5$; and (2) the shifted value is then added to 1f (hexadecimal) to obtain the add-on token. As such, the add-on tokens will have values ranging from 20 (hexadecimal) to 3e (hexadecimal) for PosD2 values ranging from 32 to 991, respectively. According to this embodiment, the terminal token is then obtained for the high-order derivative corresponding to PosD2 having a value between 32 and 991, inclusive, by performing an AND operation between the binary representation of PosD2 and 1f (hexadecimal). The high-order derivative corresponding to PosD2 having a value between 32 and 991, inclusive, will then be represented by the add-on token concatenated with the terminal token.

For high-order derivatives corresponding to PosD2 having a value at least as great as 992, the additional add-on tokens are determined according to this exemplary embodiment as follows: (1) PosD2 is divided by 992 and the remainder is dropped; and (2) the result of the remainderless division defines the number of additional add-on tokens, each of which will have a value of 3e (hexadecimal). In addition to these additional add-on tokens, a terminal token is required and one more add-on token may be needed. As such, the value of (PosD2 mod 992) is determined, thereby determining the remainder that was discarded during the prior determination of the additional add-on tokens. Based upon the value of (PosD2 mod 992), a terminal token and, possibly, another add-on token are determined as described above. In this regard, the value of (PosD2 mod 992) will be between 0 and 991, inclusive. For values of (PosD2 mod 992) between 0 and 31, inclusive, only a terminal token is required which is determined as described above in conjunction with PosD2 values of 0 to 31. In addition, for values of (PosD2 mod 992) between 32 and 991, inclusive, both a terminal token and another add-on token are required which will be determined as described above in conjunction with PosD2 values of 32 to 991. The high-order derivatives corresponding to PosD2 values of at least 992 are then represented by a concatenation of the additional add-on tokens, followed any other add-on token and the terminal token required to represent (PosD2 mod 992).

While one embodiment of a tokenizing technique has been described hereinabove for purposes of example, the system and method of the present invention can utilize other tokenizing techniques without departing from the spirit and scope of the present invention. Furthermore, the high-order derivatives need not necessarily be tokenized at all and can be directly encoded, if so desired.

Regardless of whether the high-order derivatives are tokenized, the high-order derivatives are preferably encoded, either by directly encoding the high-order derivatives or by encoding the tokenized representation of the high-order derivatives. For purposes of discussion, however, the following description will discuss the encoding of high-order derivatives that should be read to include either the high-order derivatives or the tokenized representation of the high-order derivatives. The encoding can be accomplished by any number of different encoding methods, such as Huffman coding, Shannon-Fano coding, Arithmetic coding, Range coding, Elias Delta or Gamma coding, and their respective variations, such as are well known to those skilled in the art. For example, Huffman encoding uses variable-length binary codes that each contain a unique prefix and are based on the frequency of occurrence for each symbol or character encoded, with more frequently occurring symbols or characters having smaller bit-length binary codes. As stated before, because the standard deviation is lower for higher-order derivatives, the frequency distribution of the high-order derivative information is sharpened substantially relative to the frequency distribution of the other representations. In this regard, Huffman encoding provides efficient encoding of data because it assigns the shortest codes to the most frequently occurring values, and a sharper distribution means the most frequently occurring values occur more frequently. As such, the pen-enabled computing device 10 of one advantageous embodiment utilizes Huffman coding to encode the high-order derivatives. In this embodiment, a binary code is determined for each unique numerical value required to represent the high-order derivatives, with the initial point of the first stroke and any successive beginning points remaining unencoded in some embodiments. Typically, these codes are stored in look-up tables 62 or other databases that are maintained by the non-volatile storage device 56 associated with the processing element 52.

In one advantageous embodiment, the pen-enabled computing device 10 maintains two different look-up tables 62, one including binary codes for each high-order derivative "x" value, and another including binary codes for each high-order derivative "y" value, since the high-order derivative "x" and "y" values typically have different frequency distributions. Since Huffman encoding represents each different character encoded with a binary code selected such that the more frequently occurring characters have smaller bit-length binary codes, the binary codes can be assigned in several fashions. For example, a statistical analysis can be performed upon the high-order derivative "x" values and the high-order derivative "y" values required to represent a relatively large sample of handwritten information in order to separately determine the frequency of occurrence of each different high-order derivative "x" value and each different high-order derivative "y" value, thereby enabling the look-up tables to be constructed in advance. Alternatively, a statistical analysis can be performed by the processing element 52 upon the high-order derivative "x" values and the high-order derivative "y" values required to represent the actual handwriting input, thereby allowing look-up tables to be constructed "on the fly" that are tailored to the actual handwriting input.

In order to unambiguously represent each value with a variable-length binary code, the Huffman code for each value must have a unique prefix. FIG. 4 depicts a binary tree-shaped diagram 300 illustrating the manner in which the "x" component of the second-order derivatives for the electronic ink data points illustrated in FIG. 1 and Table 1 can be represented. The encoding for each high-order derivative "x" component can be found by following the tree from the route 310 to the component in the leaf 320. As illustrated in FIG. 4, the codes representing the second-order derivative "x" components and an end-of-stroke (EOS) value (discussed below) are as follows:

"−2"=1 "0"=001 "1"=010 "3"=011 "EOS"=000

In this illustration, the second-order derivative "x" value "−2" would represent the most frequently occurring second-order derivative "x" value and, as such, the value is assigned the smallest length binary code. Based upon the look-up tables 62, the processing element 52 thereafter encodes the high-order derivatives for the "x" and "y" coordinates of each data point. In one advantageous embodiment which employs canonical Huffman encoding of sixty-four unique tokens, the look-up table can consist of an array of data structures, where each structure contains a content byte and a length byte. This is done in order to improve the encoding performance since tokens can be encoded by performing a table lookup and using the data structure elements accordingly. In this regard, since the only "1's" in the binary codes that encode the sixty four unique tokens are in the right-hand six-most bits, each binary code can be described with a content byte containing the last eight bits, i.e., the right-hand eight-most bits, and a length byte describing the code length in bits. By way of example, a Huffman code of 001 would have a content byte of 00000001 and a length byte of 3, while a Huffman code of 00000000001011 would have a content byte of 00001011 and a length byte of 14. Preferably, each bit of a code occupies a single bit of memory. The content bytes and the length bytes can therefore be maintained in order to relate each binary code to a corresponding numerical value of a high-order derivative or the tokenized representation of a high-order derivative. In this regard, each index into the {length, content} structure array corresponds to a numerical value of a high-order derivative or the tokenized representation of a high-order derivative.

Once the processing element 52 determines the binary code for the "x" and "y" components of each high-order derivative, the codes are strung together to form a concatenated string of Huffman codes. While the processing element can separately string together the codes for the "x" and "y" components, in a preferred embodiment the codes for each component are strung together in a single string of interleaving components. In this embodiment, the codes for each "x" component are correspondingly followed by that component's respective "y" component, and then the next "x" component and it's "y" component, and so forth. Preferably, the concatenated string of Huffman codes is ordered in the same fashion as the data points such that the correspondence of each code to a respective data point can be readily determined.

Since the length of each code is different depending upon its frequency of occurrence and the number of points in each stroke varies, however, the strings will vary in length, thus requiring additional information to be attached to each string to distinguish one string from the next. This additional information allows a decoder to distinguish the end of one string from the beginning of the next string, and can comprise such information as the length of the string or a unique end-of-stroke value attached to the end of each string, with the end-of-stroke value preferred. Because Huffman encoding uses unique prefixes for each code, however, individual codes within each string do not require this additional information. The prefix property of Huffman codes guarantees that, within a given encoding, no single Huffman code will be the prefix of any other Huffman code in the encoding tree. This allows the Huffman-encoded tokens to be concatenated together without length information or delimiters, and still remain decodable. In addition, zeros can be added to the end of the concatenated string such that the resulting string ends with a byte boundary.

By way of example and with reference to the binary codes set forth above and represented by the tree structure of FIG. 4, the processing element can Huffman encode the second-order derivative "x" component values illustrated in Table 1 as follows:

$$d_2x=3+0+1+(-2)=011+001+010+1$$

In this example, "+" designates the concatenation of the codes, not addition. Adding the end-of-stroke value of "000," as shown in FIG. 4, to the end of the Huffman encoded value, the resulting string becomes:

Huffman Encoded String=0110010101000

The resulting Huffman encoded string requires less storage capacity to store the string and requires less bandwidth to transmit. The actual compression ratio of the encoded string to conventional representations of handwriting data, however, depends on the resolution of the handwriting data and sampling rate of the handwriting capture interface. For example, the handwriting capture interface of the Cross-Pad™ writing tablet, manufactured by the A.T. Cross Company, captures handwriting data at a resolution of 254 dots per inch, and at a rate of 133 pixels per second. Using the CrossPad™ handwriting capture interface, resulting Huffman encoded string would achieve an eight to one compression ratio over the conventional representation. Once the processing element 52 has created the strings of encoded "x" and "y" components of the high-order derivatives of the data points, the pen-enabled computing device 10 can store and/or transmit the strings as indicated by block 250 of FIG. 3. As previously mentioned, in one embodiment, the pen-enabled computing device includes a non-volatile storage device 56. The pen-enabled computing device can therefore use this non-volatile storage device to store the strings for later transmission as shown in block 290 of FIG. 3. In other embodiments, the pen-enabled computing device communicates with one or more remote computing devices, such as servers, personal computers, PDAs, PCSs or other types of computing devices, that are capable of decoding the strings and processing, displaying or otherwise utilizing the handwriting input originally captured by the pen-enabled computing device.

In this regard, FIG. 5 illustrates a system that includes a first computing device, such as the pen-enabled computing device 10, that is capable of transmitting handwritten information to a second computing device 110. The second computing device is typically a server that is adapted to receive the handwritten data transmitted by the first computing device and to thereafter process the handwritten data. However, the second computing device can be any of a variety of other types of computing devices, such as a mainframe computer, a personal computer, a workstation or the like, so long as the second computing device is capable of performing the functions described hereinbelow. Typically, the second computing device is adapted to further transmit messages that include the handwritten information originally captured by the first computing device. In this regard, the second computing device can transmit messages including the handwritten information to a variety of remote devices, such as a personal computer 130, a facsimile machine 150, an e-mail server 120, a PDA, a PCS or other computing device 140 having e-mail, facsimile, or instant messaging capability, such that the intended recipient will receive and can view the message including the handwritten information.

The first and second computing devices and, in turn, the second computing device and the remote devices can communicate in a variety of different manners. For example, the first and second computing devices can communicate wirelessly, such as by means of a wireless local area network (LAN) or a wireless wide area network (WAN). In this regard, both the first and second computing devices can include transceivers for wirelessly transmitting handwritten data. Alternatively, the first and second computing devices can be connected via a conventional wired LAN or wired WAN or by any other wired connection. As such, both the first and second computing devices can include external device interfaces for supporting the wired connection. As will be apparent to those skilled in the art, the first and second computing devices may be configured to communicate directly or may communicate indirectly via one or more intermediate computing devices, such as the intermediate personal computer 100 depicted in FIG. 5, or intermediate servers, not illustrated. In addition to being capable of being interconnected by a variety of different manners, the first and second computing devices can communicate by any of a number of different communications protocols, although standard Internet communication protocols are typically preferred.

Similarly, the second computing device 110 is capable of communicating with the remote devices by any of a number of different manners, such as via wireless connections or wired connections as illustrated in FIG. 5. Furthermore, the second computing device can communicate with the remote devices according to any of a variety of communications protocols, although standard Internet communications protocols are also preferred. Additionally, while the system depicted in FIG. 5 illustrates a second computing device that communicates with a variety of remote devices, the system may be designed such that the first computing device communicates directly with one or more remote devices such that the remote device and the second computing device are one and the same.

In operation, the pen-enabled computing device 10 communicates with the second computing device 110 by sending handwritten data representative of the handwriting input captured by the pen-enabled computing device. Preferably, the handwritten data includes a representation of the x and y coordinates of one or more reference data points, such as the initial data point of the first stroke and any successive beginning data points, along with the message strings that encode the x and y components of the high-order derivative associated with each successive data point. The second computing device, in turn, includes a processing element, such as a central processing unit, for reconstructing the handwriting input from the handwritten data received from the first computing device. Advantageously, the processing element of the second computing device can reconstruct the handwriting input without reference to any of the originally captured electronic ink data points other than the reference data point, such as the initial data point. In this regard, the set of data points captured by the first computing device can be recovered by the second computing device by initially decoding the handwritten data and then reversing the tokenizing process and processing the high-order derivatives to determine the original data points in the manner set forth above and depicted in blocks 270 and 280 of FIG. 3. As such, the second computing device preferably recovers the original data points in a lossless manner.

By way of example, for handwritten data that has been Huffman encoded by the first computing device 10, the processing element of the second computing device 110 preferably decodes the string of handwritten data using a method known to those skilled in the art and illustrated by the tree structure of FIG. 4. By starting with the most significant bit of the string and following the paths down the tree based on whether the bits in the string are "0s" or "1s," the second computing device can decode the "x" and "y" components of the high-order derivative of each successive electronic ink data points. In this regard, separate tree structures are typically utilized for the high-order derivative "x" and "y" components since the numerical values of each component typically have a somewhat different frequency distribution. Preferably, a representation of each tree structure is preferably stored on both the first and second computing devices. For computational efficiency, the "content" and "length" array of structures is stored on the encoding side, and tree representation is stored on the decoding side.

In instances in which the high-order derivatives have been tokenized, the processing element of the second computing device 110 then detokenizes the decoded values by utilizing the algorithms and the tokenizing process described above to obtain the high-order derivative components. Using the decoded high-order derivative components and the reference data points, the second computing device can then reconstruct the original handwriting input captured by the first computing device by utilizing the equations defining the mathematical relationship between a current point and the previous point. Once the original handwriting input has been recovered, the second computing device 110 can render the handwriting input or automatically convert it to computer usable text or otherwise process it. While the second computing device can render the handwriting input in various manners, the second computing device of one embodiment renders the handwriting input into a bitmap representation by utilizing line drawing techniques known to those skilled in the art in order to connect adjacent pairs of the data points. In order to improve the appearance of the handwriting input, the second computing device can smooth the lines and can interpolate between adjacent pairs of the data points in order to improve the resolution of the handwriting input, as described in more detail in the U.S. patent application Ser. No. 09/769,115 entitled System, Computer Program Product and Method for Transmitting and Processing Handwritten Data by Gregory J. Clary et al. filed concurrently herewith, the contents of which are incorporated herein by reference.

Once the second computing device 110 has rendered the handwritten information including any interpolation or smoothing of the handwritten information that is to be performed, the second computing device can store a representation of the handwritten information, such as an image representation of the handwritten information, for incorporation into a message to an intended recipient at some future time. Alternatively, the second computing device can create a message that includes an image of the handwritten information immediately upon rendering the handwritten information. The second computing device can be adapted to create a variety of different types of messages, such as e-mail messages, facsimiles or instant messages, depending upon the directions received by the second computing device from the user of the first computing device 10 or depending upon prior parameters that have been defined with respect to messages directed to the intended recipient. In this regard, the directions provided by the user of the first computing device typically include the name or other identifier, such as an email address or facsimile number, of the intended recipient and the type of message to be transmitted to the intended recipient, as described in more detail in U.S. patent application Ser. No. 09/769,115 entitled System, Computer Program Product and Method for Transmitting and Processing Handwritten Data by Gregory J. Clary et al. filed concurrently herewith.

In instances in which the handwritten information is to be incorporated into an e-mail message to the intended recipient, the second computing device can embed an image of the handwritten information, such as a .gif image, into a hypertext mark-up language (html) document that becomes the body of the e-mail message. For most current e-mail clients operating on personal computers or other remote devices 130, such as Lotus Notes or Outlook Express, the image of the handwritten information will appear in the body of the e-mail message itself. However, some remote devices may include older e-mail clients, such as older versions of Lotus Notes, for example, that will place the image of the handwritten information in an attachment to the e-mail message. In some instances, the e-mail client will determine whether the image will appear in the body of the e-mail message or as an attachment. But in other instances, where the second computing device has information about the characteristics of the e-mail client regarding images, the server may decide whether to send the message with the image appearing in the body of the message or as an attachment. In either instance, the recipient can open the e-mail message to view the image of the handwritten information. As such, maps, diagrams, drawings, documents including Asian language characters and other images that could not easily be represented by text can readily be transmitted via the system and method of the present invention. Likewise, an instant message containing an image of the handwritten information can be transmitted from the second computing device to a remote device 140 having instant messaging capability as will be apparent to those skilled in the art. Still further, an image of the handwritten information can be included in the body of a facsimile transmitted by the second computing device to the facsimile machine 150 of the intended recipient.

In one advantageous embodiment, portions of the system and method of the present invention, such as portions of the processing element 52 of the pen-enabled computing device 10, include a computer program product 58. The computer program product includes a computer-readable storage medium, such as the non-volatile storage medium, and computer-readable program code portions, such as a series of computer instructions, embodied in the computer-readable storage medium for receiving the handwriting input consisting of a plurality of data points and for subsequently processing handwriting input so as to compress and encode the handwriting input as described hereinabove. Typically, the computer program is stored by the processing element or a related memory device, such as a non-volatile storage device 56, and is executed by the pen-enabled computing device upon receipt of handwriting input from the handwriting capture interface 50.

In this regard, FIG. 3 is a block diagram, flowchart and control flow illustration of methods, systems and program products according to the invention. It will be understood that each block or step of the block diagram, flowchart and control flow illustration, and combinations of blocks in the block diagram, flowchart and control flow illustration, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustration support combinations of means for performing the specified functions, combinations of steps for performing the specified functions and program instruction means for performing the specified functions. It will also be understood that each block or step of the block diagram, flowchart or control flow illustration, and combinations of blocks or steps in the block diagram, flowchart or control flow illustration, can be implemented by special purpose hardware-based computer systems which perform the specified functions or steps, or combinations of special purpose hardware and computer instructions.

By representing the handwriting input with a high-order derivative, and encoding the high-order derivative data, the system, device, computer program product and method of the present invention allow handwriting input to be stored in a more compact manner so as to conserve memory resources and/or to be transmitted in a manner that utilizes a narrower bandwidth than conventional systems. In particular, the compressed, encoded handwriting input requires fewer bits to represent the data points captured by the first computing device which, in turn, decreases the storage capacity required to store and/or the bandwidth required to transmit the values. However, the compressed, encoded handwriting input can be decoded and decompressed in a reliable, computationally efficient and lossless manner so as to recover the handwriting input without reference to any of the original data points, other than the a reference data point, such as the initial data point.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for representing a plurality of electronic ink data points, said method comprising:
    capturing a plurality of electronic ink data points based upon a position of a writing stylus;
    determining a high-order derivative of the plurality of electronic ink data points, wherein the high-order derivative comprises a derivative of at least the second order;
    representing the high-order derivative of the plurality of electronic ink data points with respective tokens; and
    encoding the tokens representing the high-order derivative of the plurality of electronic ink data points in order to obtain a compressed representation of the electronic ink data points.

2. A method according to claim 1 wherein said capturing comprises sensing the position of the writing stylus with respect to an electronic handwriting tablet of a pen-enabled computing device, and capturing a series of electronic ink data points based upon the position of the writing stylus with respect to the handwriting tablet over time.

3. A method according to claim 1 wherein said encoding comprises Huffman encoding the high-order derivative.

4. A method according to claim 1 wherein said determining comprises determining the second-order derivative of the plurality of electronic ink data points.

5. A method according to claim 1 further comprising storing the compressed representation of the plurality of electronic ink data points.

6. A method according to claim 1 further comprising transmitting the compressed representation of the plurality of electronic ink data paints.

7. A method according to claim 1 farther comprising reconstructing the plurality of electronic ink data points based upon the high-order derivative, wherein said reconstructing occurs independent of all but one of the plurality of electronic ink data points that were captured.

8. A method according to claim 7 wherein said reconstructing comprises decoding the high-order derivative of the plurality of electronic ink data points.

9. A computer program product adapted to execute within a pen-enabled computing device having a writing stylus, and to obtain a representation of a plurality of electronic ink data points, said computer program product comprising:
    a first executable portion for capturing the plurality of electronic ink data points based upon a position of the writing stylus;
    a second executable portion for determining a high-order derivative of the plurality of electronic ink data points, wherein the high-order derivative comprises a derivative of at least the second order;
    a fourth executable portion for representing the high order derivative of the plurality of electronic ink data points with respective tokens; and
    a third executable portion for encoding the tokens representing the high-order derivative of the electronic ink data points.

10. A computer program product according to claim 9 wherein the pen-enabled computing device further includes an electronic handwriting tablet capable of interacting with the writing stylus, and wherein said first executable portion captures a series of electronic ink data points based upon the position of the writing stylus with respect to the handwriting tablet over time.

11. A computer program product according to claim 9 wherein said second executable portion determines the second-order derivative of the plurality of electronic ink data points.

12. A computer program product according to claim 9 wherein said third executable portion Huffman encodes the high-order derivative.

13. A pen-enabled computing device for representing a plurality of electronic ink data points comprising:
    a writing stylus;
    a handwriting capture interface, responsive to said stylus, for capturing a plurality of electronic ink data points based upon a position of the writing stylus; and
    a processing element, responsive to said handwriting capture interface, for determining a high-order derivative of the plurality of electronic ink data points, the high-order derivative comprising a derivative of at least the second order, wherein said processing element is also capable of representing the high order derivative of the plurality of electronic ink data points with respective tokens, and wherein said processing element is further capable of encoding the tokens representing the high-order derivative of the plurality of electronic ink data points.

14. A pen-enabled computing device according to claim 13 wherein said handwriting capture interface further comprises an electronic handwriting tablet capable sensing the relative position of said writing stylus.

15. A pen-enabled computing device according to claim 13 wherein said processing element Huffman encodes the high-order derivative of the plurality of electronic ink data points.

16. A pen-enabled computing device according to claim 13 wherein said processing element determines the second-order derivative of the plurality of electronic ink data points.

17. A pen-enabled computing device according to claim 13 further comprising a user interface, wherein said processing element is further adapted to cooperate with said user interface to provide handwritten information to a user.

18. A pen-enabled computing device according to claim 13 further comprising a storage device, responsive to said processing element, for storing the encoded high-order derivative of the plurality of electronic ink data points.

19. A pen-enabled computing device according to claim 13 further comprising a transmitter, responsive to said processing element, for transmitting the encoded high-order derivative of the plurality of electronic ink data points.

20. A method for capturing and reconstructing handwritten information, said method comprising:
    capturing a plurality of electronic ink data points based upon a position of a writing stylus;
    determining a high-order derivative of the plurality of electronic ink data points, wherein the high-order derivative comprises a derivative of at least the second order;
    representing the high order derivative of the plurality of electronic ink data points with respective tokens; and
    reconstructing the plurality of electronic ink data points based upon the high-order derivative, wherein said reconstructing occurs independent of all but one of the plurality of electronic ink data points that were captured.

21. A method according to claim 20 wherein said capturing comprises sensing the position of the writing stylus with respect to an electronic handwriting tablet of a pen-enabled computing device, and capturing a series of electronic ink data points based upon the position of the writing stylus with respect to the handwriting tablet over time.

22. A method according to claim 20 wherein said determining comprises determining the second-order derivative of the plurality of electronic ink data points.

23. A method according to claim 20 further comprising encoding the high-order derivative of the plurality of electronic ink data points after determining the high-order derivative.

24. A method according to claim 23 wherein said encoding comprises Huffman encoding the high-order derivative.

25. A method according to claim 23 wherein said reconstructing comprises decoding the encoded, high-order derivative of the plurality of electronic ink data points.

26. A method according to claim 20 further comprising storing a representation of the high-order derivative of the plurality of electronic ink data points.

27. A method according to claim 20 further comprising transmitting a representation of the high-order derivative of the plurality of electronic ink data points.

28. A system for transmitting handwritten information comprising:
    a first computing device comprising:
        a writing stylus;
        a handwriting capture interface, responsive to said stylus, for capturing a plurality of electronic ink data points based upon a position of said writing stylus;
        a processing element for determining a high-order derivative of the plurality of electronic ink data points, the high-order derivative comprising a derivative of at least the second order, wherein said processing element of said first computing device is further capable of representing the high order derivative of the plurality of electronic ink data points with respective tokens; and
        a transmitter for transmitting data representative of the high-order derivative of the plurality of electronic ink data points; and
    a second computing device for receiving the data transmitted by the first computing device, said second computing device comprising a processing element for reconstructing the plurality of electronic ink data points based upon the high-order derivative, wherein the reconstructing occurs independent of all but one of the plurality of electronic ink data points that were captured by the processing element of the first computing device.

29. A system according to claim 28 wherein said handwriting capture interface further comprises an electronic handwriting tablet capable of sensing the relative position of said writing stylus.

30. A system according to claim 28 wherein said processing element of said first computing device determines the second-order derivative of the plurality of electronic ink data points.

31. A system according to claim 28 further comprising a user interface, wherein said processing element of said second computing device is further adapted to cooperate with said user interface to provide the handwritten information to a user.

32. A system according to claim 28 further comprising a storage device, responsive to said processing element of said first computing device, for storing the high-order derivative of the plurality of electronic ink data points.

33. A system according to claim 28 wherein said processing element of said first computing device is further capable of encoding the high-order derivative of the plurality of electronic ink data points.

34. A system according to claim 33 wherein said processing element of said first computing device Huffman encodes the high-order derivative.

35. A system according to claim 33 wherein said processing element of said second computing device is adapted to reconstruct the plurality of electronic ink data points by decoding the encoded high-order derivative of the plurality of electronic ink data points.

36. A system according to claim 28 wherein said processing element of said second computing device is capable of formatting the reconstructed plurality of electronic ink data points into handwritten information capable of being communicated by at least one selected from a group consisting of an email message, a facsimile and an instant message.

37. A computing device for processing a compressed representation of a plurality of electronic ink data points, wherein the compressed representation is based upon tokens representing a high-order derivative of the plurality of electronic ink data points, said computing device comprising:

a receiver for receiving the compressed representation of the plurality of electronic ink data points; and a processing element for reconstructing the plurality of electronic ink data points based upon the tokens representing the high-order derivative of the electronic ink data points, wherein the reconstructing occurs independent of all but one of the plurality of electronic ink data points that were received by the receiver.

38. A computing device according to claim 37 wherein said processing element is capable of formatting the reconstructed plurality of electronic ink data points into handwritten information capable of being communicated by at least one selected from a group consisting of an email message, a facsimile and an instant message.

39. A computing device according to claim 37 further comprising a user interface, wherein said processing element is further adapted to cooperate with said user interface to provide handwritten information to a user based upon the reconstructed plurality of electronic data points.

40. A method for processing a compressed representation of a plurality of electronic ink data points, wherein the compressed representation is based upon tokens representing a high-order derivative of the plurality of electronic ink data points, said method comprising:

receiving the compressed representation of the plurality of electronic ink data points; and reconstructing the plurality of electronic ink data points based upon the tokens representing the high-order derivative of the electronic ink data points, wherein the reconstructing occurs independent of all but one of the plurality of electronic ink data points that were received.

41. A method according to claim 40 further comprising formatting the reconstructed plurality of electronic ink data points into handwritten information capable of being communicated by at least one selected from a group consisting of an email message, a facsimile and an instant message, after reconstructing the plurality of electronic ink data points.

42. A computing device according to claim 40 further comprising providing handwritten information to a user based upon the reconstructed plurality of electronic data points, after reconstructing the plurality of electronic ink data points.

* * * * *

UNITED STATES PATENT AND TRADEMARK OFFICE
CERTIFICATE OF CORRECTION

PATENT NO.      : 6,741,749 B2
DATED           : May 25, 2004
INVENTOR(S)     : Hebert, Jr.

It is certified that error appears in the above-identified patent and that said Letters Patent is hereby corrected as shown below:

Title page,
Item [75] Inventor, "Herbert" should read -- Hebert --.

Column 18,
Line 41, "farther" should read -- further --.

Signed and Sealed this

Tenth Day of August, 2004

JON W. DUDAS
*Acting Director of the United States Patent and Trademark Office*